2,952,597
PROCESS FOR SYNTHESIZING NITRILES

Charles S. Cleaver and Blaine C. McKusick, Wilmington, Del., assignors to E. I. du Pont de Nemours and Company, Wilmington, Del., a corporation of Delaware No Drawing. Filed July 26, 1957, Ser. No. 674,296

20 Claims. (Cl. 204—154)

This invention is concerned with a new process for the preparation of nitriles, compounds particularly useful for conversion to the corresponding carboxylic acids by hydrolysis with aqueous mineral acids and alkalies.

Nitriles have been obtained heretofore by many reactions as shown, for example, by Wagner and Zook, "Synthetic Organic Chemistry," John Wiley & Sons, Inc., 1953, pages 591–633. Several of these reactions employ hydrogen cyanide as the source of the nitrile group. All the known methods, however, require the presence of a chemically-reactive function at the site in the molecule to be occupied by the nitrile group in order for the hydrogen cyanide to react. Hydrogen cyanide has thus been added to lactones to yield salts of cyano acids, to imines to yield $\alpha$-aminonitriles, to carbonyl compounds to yield $\alpha$-hydroxy nitriles, and to olefins to yield nitriles.

An object of this invention is, consequently, provision of a general process for the preparation of nitriles.

Another object is provision of a method adapted for preparing nitriles from hydrogen cyanide and organic compounds lacking a chemically-reactive function at the position to be occupied by the nitrile function.

The above-mentioned and yet other objects are accomplished in accordance with this invention by a process in which a mixture of hydrogen cyanide and an organic compound containing at least one C—H bond is exposed to ionizing radiation. This process may be generally illustrated by the equation:

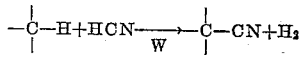

C—H compounds suitable for use in this invention are preferably those in which the hydrogen atom that reacts with the hydrogen cyanide is joined to a carbon atom possessing no multiple bonds other than those of aromatic unsaturation. Furthermore, the C—H compounds are preferably free of aliphatic carbon-to-carbon unsaturation. Thus, there are included saturated aliphatic compounds, saturated aryl aliphatic compounds, and aromatic compounds and the corresponding halides, carboxylic acids and derivatives such as esters and salts, alcohols, ethers, amines, and nitro compounds. Of these, a preferred group are the aliphatic, aryl aliphatic, and aromatic hydrocarbons. Generally the preferred compounds will possess no more than about 30 carbon atoms, i.e., the approximate number in paraffin waxes, but compounds containing larger numbers can be employed.

Suitable "ionizing radiations" for use in this invention include both radiation in the form sometimes regarded as particle radiation and radiation in the form sometimes regarded as ionizing electromagnetic radiation.

By "particle radiation" is meant a stream of particles such as electrons, protons, neutrons, alpha-particles, deuterons, beta-particles, or the like, so directed that the said particles impinge upon the mixture of hydrogen cyanide and C—H compound. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile, or from radioactive isotopes or from other natural or artificial radioactive materials.

By "ionizing electromagnetic radiation" is meant radiation of the type produced when a metal target (e.g., gold or tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or the photons of radiation commonly considered as wave or electromagnetic radiation in electron volts (E.V.) or million electron volts (mev.). In the irradiation process of this invention, radiation consisting of particles or photons having an energy of 50 E.V. and over may be employed and particles or photons having an energy of 0.1 mev. and over are preferred. With radiation of this type, nitriles can be obtained from hydrogen cyanide and a C—H compound with a minimum length of exposure to the radiation, permitting maximum efficiency in utilization of the radiation. Particles or photons with an energy equivalent of 0.5–4 mev. are the most useful from a practical standpoint, although radiation with energies of 10 mev. and higher may be employed.

A minimum dosage of at least $10^4$ rads is necessary since lower dosages do not give high enough percentage conversions to be useful. The amount of product formed by a given dose in rads usually increases with decreasing beam intensity. Dosages as high as $10^8$ to $10^9$ rads and higher may be employed. The exposure may be carried out in one slow pass, or in several faster ones, and may be conducted at any convenient rate of energy input. One rad is the quantity of radiation which will result in an absorption of 100 ergs per gram of irradiated material.

Temperature and pressure are not critical in the invention. Ambient atmospheric temperature may be used, as it is convenient. Since loss through decomposition of the product may occur from excessive rise in temperature, cooling will generally be employed. A temperature of 0–100° C. is usually preferred. Pressures will generally be atmospheric or, in the case of closed vessels, autogenous. Both subatmospheric and supraatmospheric pressures are usable.

The reaction may be carried out in either the gaseous or liquid phase or with one of the reactants solids. Since hydrogen cyanide boils at 26.5° C. under 760 mm. of mercury pressure, it will be appreciated that fairly careful but obvious control of pressure and temperature are necessary when it is desired to operate in the liquid phase. The presence of more than one reactant phase does not stop the reaction, but may lower the efficiency thereof by reducing the extent of mixture of the reactant.

When operating in the liquid phase or with a solid reactant, it may be desirable, though optional, to employ an inert atmosphere such as one of nitrogen, helium, argon or the like. If such an atmosphere is moved through the mixture, e.g., as a stream of nitrogen, it can provide some agitation.

The mole ratio of HCN to —CH group or organic reactant is not critical. Generally, however, an HCN:organic compound mole ratio of between about 1:10 and 10:1 will be employed.

The physical manipulations required in carrying out the process are very simple. Hydrogen cyanide and the —CH-containing organic reactant are simply mixed (or contacted, in the case of some organic solids) and irradiated. In one preferred embodiment of the invention, for example, a gaseous mixture of methane and hydrogen cyanide with a mole ratio of about 1:1 is exposed to 3 mev. electrons for a dosage of $10^9$ rads at a temperature of about 30–100° C. Acetonitrile is separated by gas chromatography.

In the following examples, parts are by weight and pressures are ambient atmospheric unless otherwise noted. Irradiation temperatures are about 0° C. as maintained by ice.

EXAMPLE 1

A solution of 50 ml. of freshly distilled hydrogen cyanide (1.28 moles) in 425 ml. of benzene (4.8 moles) is stirred vigorously in an ice-cooled, horizontal glass tube of 1-mm. wall thickness. While a slow stream of nitrogen passes through the vessel, it is exposed to a 500-watt beam of 2-mev. electrons for 60 minutes. Roughly $9 \times 10^5$ watt-seconds of electronic energy is absorbed by the reactants. The purpose of the nitrogen stream is to keep out oxygen from the air, which would give rise to unwanted oxidation products. Distillation of the reaction mixture gives 2.2 g. of benzonitrile, B.P. 65–75° C./23 mm. of 90–95% purity as indicated by its infrared spectrum.

In confirmation of the identity of the benzonitrile, 2.0 g. is refluxed for an hour with 75% sulfuric acid, and 0.60 g. of benzoic acid is isolated from the reaction mixture. The benzoic acid is identified by a direct comparison of its melting point (121–123° C.) and infrared spectrum with those of an authentic sample of benzoic acid.

The hydrolyzate from which the benzoic acid was isolated is made strongly basic and partially distilled. The distillate is acidified and treated successively at 0° C. with sodium nitrite, sulfamic acid, 2-naphthol and sodium hydroxide. By this means, 0.052 g. of 1-phenylazo-2-naphthol is obtained, showing that phenyl isocyanide was formed during the irradiation of the mixture of hydrogen cyanide and benzene. 1-phenylazo-2-naphthol is identified by direct comparison of its melting point 132–133° C.) and visible absorption spectrum with those of an authentic sample.

A 0.4-g. distillate, B.P. 85–90° C./3 mm., is collected after removal of benzonitrile by distillation. It solidifies on cooling and is identified as biphenyl, M.P. 68–69° C., after recrystallization from methanol.

EXAMPLE 2

A solution of 50 ml. of hydrogen cyanide in 425 ml. (4.0 moles) of toluene is irradiated with 2-mev. electrons under the conditions of Example 1. Two fractionations of the reaction mixture give 2.9 g. of a mixture of tolunitriles, B.P. 74–90° C./9 mm. By analysis of infrared and ultraviolet spectra of the mixture, it is shown to contain 1.1 g. of p-tolunitrile, 1.0 g. of o-tolunitrile, 0.5 g. of α-tolunitrile and 0.3 g. of m-tolunitrile.

Confirmation of the spectroscopic data is obtained by hydrolyzing the reaction mixture with 75% sulfuric acid. A mixture of the four toluic acids is obtained from which pure p-toluic acid and o-toluic acid are isolated and identified by their melting points, elemental compositions, and infrared spectra. Treatment of the hydrolysis mixture as in the preceding example permits the isolation of a 2.2-mg. mixture of isomeric 1-tolylazo-2-naphthols. This demonstrates that a small amount of a tolyl isocyanide mixture is formed during irradiation of the mixture of toluene and hydrogen cyanide.

EXAMPLE 3

A mixture of 425 ml. of cyclohexane (3.95 moles) and 50 ml. of hydrogen cyanide is irradiated for 45 minutes under the conditions of Example 1. Two distillations make possible the isolation of 0.4 g. of cyclohexanecarbonitrile. It is identified by means of its infrared spectrum. It is further identified by hydrolyzing it with 75% sulfuric acid. The cyclohexanecarboxylic acid is extracted from the hydrolysis mixture with chloroform and is isolated as the sodium salt by means of partition chromatography with silicic acid. The salt is converted to p-bromophenacyl cyclohexanecarboxylate, identified by direct comparison of its melting point (91-92° C.) and infrared spectrum with those of an authentic specimen.

By means of fractional distillation, bicyclohexyl, B.P. 93–96° C./8 mm., is isolated. It is identified by means of its infrared spectrum.

When the liquid C—H compounds indicated in Table I are substituted for benzene in Example 1, the products contain the respective nitriles indicated:

*Table I*

| C—H Compound | Product(s) |
|---|---|
| n-octane | pelargononitrile; α-methylcaprylonitrile; α-ethylenanthonitrile; α-propylcapronitrile. |
| chloroform | trichloroacetonitrile. |
| 1,2-dichloro-1,2,2-trifluoroethane. | α,β-dichloro-α,β,β-trifluoropropionitrile. |
| 1,1,2-trichloro-2,2-difluoroethane. | α,α,β-trichloro-β,β-difluoropropionitrile. |
| 1-bromopropane | α-bromobutyronitrile; γ-bromobutyronitrile; β-bromoisobutyronitrile. |
| 1,2-dichloropropane | α,β-dichlorobutyronitrile; β,γ-dichlorobutyronitrile; α,β-dichloroisobutyronitrile. |
| chlorobenzene | o-chlorobenzonitrile; m-chlorobenzonitrile; p-chlorobenzonitrile. |
| methanol | glycolonitrile. |
| ethanol | lactonitrile; hydracrylonitrile. |
| propanol | α-hydroxybutyronitrile; γ-hydroxybutyronitrile; β-hydroxyisobutyronitrile. |
| 2-propanol | β-hydroxybutyronitrile; α-hydroxyisobutyronitrile. |
| 1-chloro-2-propanol | α-chloro-β-hydroxybutyronitrile; β-chloro-α-hydroxyisobutyronitrile; γ-chloro-β-hydroxybutyronitrile. |
| diethyl ether | α-ethoxypropionitrile; β-ethoxypropionitrile. |
| propylamine | α-aminobutyronitrile; γ-aminobutyronitrile; β-aminoisobutyronitrile. |
| 1-nitrobutane | α-nitrovaleronitrile; δ-nitrovaleronitrile; α-methyl-γ-nitrobutyronitrile; α-(nitromethyl) butyronitrile. |
| nitrobenzene | o-nitrobenzonitrile; m-nitrobenzonitrile; p-nitrobenzonitrile. |
| methyl acetate | methyl cyanoacetate; cyanomethyl acetate. |
| sodium propionate | sodium α-cyanopropionate; sodium β-cyanopropionate. |
| adipic acid | 2-cyanoadipic acid; 3-cyanoadipic acid. |

When the starting C—H compound is normally a gas, it may be compressed along with hydrogen cyanide in a metal cylinder and irradiated with a penetrating form of radiation to obtain a nitrile product. For example, when a mixture of ethane and hydrogen cyanide is compressed into a stainless steel cylinder and irradiated with high energy X-rays, such as those produced by impinging 2 mev. electrons on a gold target, propionitrile is obtained. In a similar manner, other normally gaseous C—H compounds are irradiated in the presence of hydrogen cyanide to yield the products shown in Table II:

*Table II*

| C—H Compound | Product(s) |
|---|---|
| propane | butyronitrile; isobutyronitrile. |
| butane | valeronitrile; α-methylbutyronitrile. |
| neopentane | β,β-dimethylbutyronitrile. |
| chloromethane | chloroacetonitrile. |
| fluoroform | trifluoroacetonitrile. |
| chloroethane | α-chloropropionitrile; β-chloropropionitrile. |
| fluoroethane | α-fluoropropionitrile; β-fluoropropionitrile. |
| methyl ethyl ether | α-methoxypropionitrile; β-methoxypropionitrile; ethoxyacetonitrile. |
| methylamine | glycinonitrile. |
| dimethylamine | N-methylglycinonitrile. |
| ethylamine | α-aminopropionitrile; β-aminopropionitrile. |

The reaction of hydrogen cyanide with a solid C—H compound according to this invention may be carried out by employing the solid in a finely divided form and handling as a slurry in an excess of liquid hydrogen cyanide, the irradiation being carried out according to the procedure of Example 1. Thus, a slurry of naphthalene in hydrogen cyanide irradiated with 2 mev. electrons yields a mixture of 1-naphthonitrile and 2-naphthonitrile. A similar slurry of anthracene in hydrogen cyanide yields a mixture of 1-, 2-, and 9-anthronitriles when irradiated. A mixture of carbonitriles containing up to 30 carbon atoms is obtained when a mixture of paraffin wax in hydrogen cyanide is irradiated in this manner.

Since obvious modifications in our invention will occur to those skilled in the chemical art, we propose to be bound solely by the appended claims.

The embodiments of the invention in which an exclusive property or privilege is claimed are defined as follows:

1. The process which comprises subjecting a mixture of hydrogen cyanide and an organic compound which contains a C—H group and in which any carbon-to-carbon multiple bond is aromatic to at least $10^4$ rads of ionizing radiation with a minimum intensity of 50 electron volts and recovering at least one nitrile from the irradiated mixture.

2. The process of claim 1 in which the organic compound contains no more than 30 carbons.

3. The process of claim 1 in which the minimum energy of the ionizing radiation is about 0.1 million electron volts.

4. The process of claim 1 in which the ionizing radiation is particulate.

5. The process of claim 4 in which the ionizing radiation is electrons.

6. The process of claim 1 in which the ionizing radiation is electromagnetic radiation.

7. The process of claim 6 in which the ionizing radiation is X-rays.

8. The process of claim 6 in which the ionizing radiation is gamma rays.

9. The process which comprises irradiating a mixture of benzene and hydrogen cyanide with at least $10^4$ rads of ionizing radiation having an energy of at least 50 electron volts and separating at least one nitrile from the irradiated mixture.

10. The process of claim 9 in which the energy of the ionizing radiation is at least 100,000 electron volts.

11. The process of claim 10 in which the ionizing radiation is electrons.

12. The process which comprises irradiating a mixture of toluene and hydrogen cyanide with at least $10^4$ rads of ionizing radiation having an energy of at least 50 electron volts and separating at least one nitrile from the irradiated mixture.

13. The process of claim 12 in which the energy of the ionizing radiation is at least 100,000 electron volts.

14. The process of claim 13 in which the ionizing radiation is electrons.

15. The process which comprises irradiating a mixture of cyclohexane and hydrogen cyanide with at least $10^4$ rads of ionizing radiation having an energy of at least 50 electron volts and separating at least one nitrile from the irradiated mixture.

16. The process of claim 15 in which the energy of the ionizing radiation is at least 100,000 electron volts.

17. The process of claim 16 in which the ionizing radiation is electrons.

18. The process which comprises irradiating a mixture of methane and hydrogen cyanide with at least $10^4$ rads of ionizing radiation having an energy of at least 50 electron volts and separating at least one nitrile from the irradiated mixture.

19. The process of claim 18 in which the energy of the ionizing radiation is at least 100,000 electron volts.

20. The process of claim 19 in which the ionizing radiation is electrons.

References Cited in the file of this patent

UNITED STATES PATENTS

| | | |
|---|---|---|
| 2,659,748 | Franz | Nov. 17, 1953 |
| 2,855,349 | Libby et al. | Oct. 7, 1958 |

OTHER REFERENCES

Bourne et al.: "Chem. and Ind.," pp. 1372–1376, Nov. 24, 1956.